US012724325B2

(12) United States Patent
Sweeney et al.

(10) Patent No.: US 12,724,325 B2
(45) Date of Patent: Sep. 1, 2026

(54) CAMERA DEVICE AND IMAGE GENERATION METHOD

(71) Applicant: HANWHA VISION CO., LTD., Seongnam-si (KR)

(72) Inventors: Jeffrey Michael Sweeney, Seongnam-si (KR); Byeong Ho Lee, Seongnam-si (KR)

(73) Assignee: HANWHA VISION CO., LTD., Seongnam-si (KR)

(*) Notice: Subject to any disclaimer, the term of this patent is extended or adjusted under 35 U.S.C. 154(b) by 2 days.

(21) Appl. No.: 18/777,931

(22) Filed: Jul. 19, 2024

(65) Prior Publication Data

US 2025/0028223 A1 Jan. 23, 2025

Related U.S. Application Data

(60) Provisional application No. 63/527,991, filed on Jul. 20, 2023.

(51) Int. Cl.

| | |
|---|---|
| ***G03B 15/03*** | (2021.01) |
| ***G03B 7/0993*** | (2021.01) |
| ***G03B 15/06*** | (2021.01) |
| ***H04N 23/51*** | (2023.01) |
| ***H04N 23/667*** | (2023.01) |
| ***H04N 23/71*** | (2023.01) |
| ***H04N 23/74*** | (2023.01) |
| ***H05B 47/105*** | (2020.01) |
| ***H05B 47/155*** | (2020.01) |

(52) U.S. Cl.

CPC ........... *G03B 15/03* (2013.01); *G03B 7/0993* (2015.01); *G03B 15/06* (2013.01); *H04N 23/51* (2023.01); *H04N 23/667* (2023.01); *H04N 23/71* (2023.01); *H04N 23/74* (2023.01); *H05B 47/105* (2020.01); *H05B 47/155* (2020.01)

(58) Field of Classification Search

CPC ..................................................... G03B 15/03

See application file for complete search history.

(56) References Cited

U.S. PATENT DOCUMENTS 7,742,070 B2 6/2010 Glatt
9,164,357 B1 10/2015 Silva et al.
(Continued)

FOREIGN PATENT DOCUMENTS

CN 107509018 A 12/2017
KR 10-0244802 B1 2/2000

*Primary Examiner* — Jayanti K Patel
*Assistant Examiner* — Christopher Kingsbury Glover
(74) *Attorney, Agent, or Firm* — Sughrue Mion, PLLC

(57) ABSTRACT

A camera device includes an image capturing device disposed in a housing and configured to generate an image signal by capturing an image. A light transmitting cover is coupled to the housing and allows light to pass therethrough toward the image capturing device. The camera device further includes a photometric sensor that senses an illuminance of light and an ultraviolet lamp disposed on one side of the light transmitting cover to irradiate ultraviolet radiation toward the cover. Operation of the ultraviolet lamp is controlled according to the illuminance sensed by the photometric sensor. The light transmitting cover exhibits a photochromic effect in response to the ultraviolet radiation irradiated by the ultraviolet lamp.

19 Claims, 12 Drawing Sheets

(56) References Cited

U.S. PATENT DOCUMENTS

| | | | | |
|---|---|---|---|---|
| 2009/0213208 | A1* | 8/2009 | Glatt | G08B 13/19628 348/36 |
| 2018/0306402 | A1* | 10/2018 | Robinson | F21S 41/657 |
| 2019/0124741 | A1* | 4/2019 | Dickie | G02C 7/102 |
| 2020/0110327 | A1* | 4/2020 | Turnbull | G03B 11/041 |
| 2021/0349366 | A1 | 11/2021 | Chen et al. | |

* cited by examiner

FIG. 2

IR RAY
780
VISIBLE RAY
400
UV RAY
10
X-RAY
400
UV-A
320
UV-B
280
UV-C
100
10

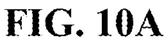
FIG. 10A
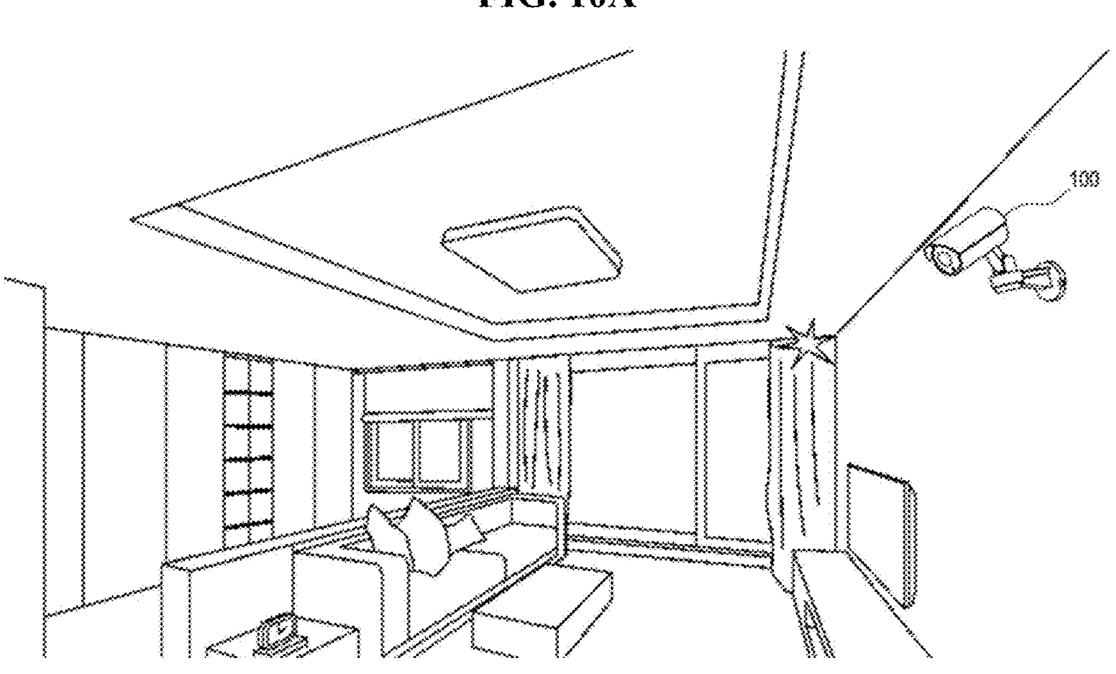
FIG. 10B

CAMERA DEVICE AND IMAGE GENERATION METHOD

CROSS-REFERENCE TO RELATED APPLICATION

This application is based on and claims priority to U.S. Provisional Patent Application No. 63/527,991 filed on Jul. 20, 2023, in the United States Patent and Trademark Office, and all the benefits accruing therefrom under 35 U.S.C. 119, the disclosure of which is incorporated by reference herein in its entirety.

BACKGROUND

1. Technical Field

The present disclosure relates to a surveillance camera, and more particularly, to a camera device that may prevent deterioration in quality of images captured in various environments such as an indoor environment with various types of lighting or an outdoor environment under sunlight, and an image generation method using the same.

2. Description of Related Art

As the security market develops in recent years, various types of surveillance camera devices have appeared in the market.

In general, the surveillance camera devices may be installed on pillars, ceilings, walls, and the like, in regions requiring surveillance, and may be used to perform direct surveillance using images captured by the surveillance camera devices or prevent crime or analyze crime scenes by storing the captured images.

A dome-type surveillance camera device mounted with a dome cover is a surveillance camera device that may be found in the surroundings because it may protect an internal image capturing unit from an external shock, humidity, and the like, may have a simple design, and may be conveniently installed. However, when a light transmitting cover of the surveillance camera device is completely transparent, the surveillance camera device may accept external light, and thus, a quality of an image captured by the surveillance camera device may be excellent. However, it may be easy to observe the inside of the surveillance camera device from the outside, and thus, the surveillance camera device may be vulnerable in terms of security. For example, when a surveilled person may look into the inside of the surveillance camera device, a problem may occur that information such as whether or not the surveillance camera device actually operates, and which direction the surveillance camera device is currently surveilling, is exposed to the surveilled person.

For this reason, products using a so-called smoke cover preventing observation of the surveillance camera device from the outside by adding an opaque pigment to the light transmitting cover of the surveillance camera device have been known. However, such conventional products may block external light significantly. Thus, a problem may occur that images become dark and qualities of the images deteriorate. Even though may be is possible to perform digital correction on the images to some extent through image processing technology, it may not be a complete solution because a quality of raw image data itself is low.

When the surveillance camera device surveils a dark environment with low external illuminance (e.g., an outdoor environment at night or an indoor environment in which lighting is turned off, etc.), such a problem caused by using the smoke cover may become more prominent.

SUMMARY

Aspects of the present disclosure provide a surveillance camera device configured to obtain a high-quality surveillance image while maintaining security so that internal components are not observed from the outside.

Aspects of the present disclosure also provide a surveillance camera device capable of selective photochromism by controlling an ultraviolet lamp according to an environment in which the surveillance camera device is installed.

However, aspects of the present invention are not restricted to those set forth herein. The above and additional aspects will be set forth in part in the description which follows and, in part, will be apparent from the description, or may be learned by practice of the presented embodiments.

According to an aspect of the disclosure, a camera device may include: an image capturing device configured to capture an image to generate an image signal; a housing in which the image capturing device is provided; a light transmitting cover coupled to the housing and configured to transmit light therethrough; a photometric sensor configured to sense an illuminance of light; an ultraviolet lamp provided on one side of the light transmitting cover and configured to irradiate an ultraviolet ray; and a controller configured to control the ultraviolet lamp according to an illuminance sensed by the photometric sensor, where the light transmitting cover is configured to exhibit a photochromic effect based on the ultraviolet ray irradiated by the ultraviolet lamp.

The photometric sensor may include: an internal photometric sensor provided inside the light transmitting cover and configured to sense an illuminance of light that is transmitted through the light transmitting cover; and an external photometric sensor provided outside the light transmitting cover and configured to sense an illuminance of external light.

The photometric sensor may be provided on the housing corresponding to at least one through hole formed in the housing.

Based on the illuminance sensed by the external photometric sensor exceeding a threshold value, the controller may be further configured to turn on the ultraviolet lamp to generate the photochromic effect in the light transmitting cover.

The controller may be further configured to adjust an intensity of the ultraviolet lamp based on an illuminance sensed by the internal photometric sensor relative to a predetermined range.

The light transmitting cover may include: a transparent layer configured to exhibit the photochromic effect; and a diffusion layer configured to diffuse the ultraviolet ray from the ultraviolet lamp via surface light emission, where the ultraviolet lamp is configured to irradiate the ultraviolet ray toward an incident portion provided at an end of the diffusion layer.

The camera device may further include: a light blocking cover provided at a coupling between an end of the light transmitting cover and the housing, and comprising a first partition wall configured to block the ultraviolet ray generated from the ultraviolet lamp from being emitted to the outside.

Based on the illuminance sensed by the external photometric sensor being less than the threshold value, the controller is further configured to turn off the ultraviolet lamp.

The camera device may further include: an infrared lamp configured to emit infrared light, where, based on the illuminance sensed by the external photometric sensor being less than the threshold value, the controller is configured to turn off the ultraviolet lamp and turn on the infrared lamp.

The image capturing device may be configured to: generate a color image based on the infrared lamp being in an off state, and generate a black-and-white image based on the infrared lamp being in an on state.

The camera device may further include: an infrared lamp configured to emit infrared light, where, based on the illuminance sensed by the external photometric sensor being less than a second threshold value lower than the threshold value, the controller is further configured to turn on the infrared lamp.

The camera device may further include an ultraviolet sensor configured to sense an ultraviolet ray intensity of the external light, where, based on the illuminance sensed by the external photometric sensor being greater than the threshold value and the ultraviolet ray intensity of the external light sensed by the ultraviolet sensor being less than a reference value, the controller is configured to turn on the ultraviolet lamp.

The controller may be further configured to: control an intensity of the ultraviolet lamp such that a combined intensity of the sensed ultraviolet ray intensity of the external light and an intensity of the ultraviolet ray irradiated by the ultraviolet lamp are within an ultraviolet ray intensity range that generates the photochromic effect.

According to an aspect of the disclosure, a camera device may include: an image capturing device configured to capture an image to generate an image signal; a housing in which the image capturing device is provided; a light transmitting cover coupled to the housing, configured to transmit light therethrough, and comprising a photochromic material that exhibits a photochromic effect based on an ultraviolet ray irradiated from outside; and a controller configured to perform image signal processing on the generated image signal to generate an output image, where, based on an intensity of the ultraviolet ray being greater than a threshold value, the photochromic effect is generated in the light transmitting cover.

The controller may be further configured to generate the output image according to a first image based on light transmitted through the light transmitting cover in which the photochromic effect is generated according to an ultraviolet ray of a first intensity and a second image based on light transmitted through the light transmitting cover in which the photochromic effect is generated according to an ultraviolet ray of a second intensity lower than the first intensity.

The controller may be further configured to generate the output image according to a first image based on light transmitted through the light transmitting cover in which the photochromic effect is generated according to an ultraviolet ray of a specific intensity and a second image based on light transmitted through the light transmitting cover in which the photochromic effect is not generated.

The camera device may further include: a photometric sensor configured to sense the intensity of the ultraviolet ray irradiated from the outside, where the controller is further configured to control at least one of a shutter speed and a diaphragm aperture of the image capturing device within a range in which a light saturation phenomenon does not occur in the output image generated based on the intensity of the ultraviolet ray.

The photochromic material may include one or more of spiropyrans, spirooxazines, fulgides, diarylethenes, silver halides, and organic dyes.

The light transmitting cover may include a plurality of dimples formed on an outer surface.

According to an aspect of the disclosure, an image generation method performed by a camera device, the camera device including an image capturing device capturing an image to generate an image signal, a light transmitting cover transmitting light therethrough and exhibiting a photochromic effect based on an intensity of an ultraviolet ray, a photometric sensor sensing illuminance of light, and a ultraviolet lamp configured to irradiate an ultraviolet ray to an inner surface of the light transmitting cover, the image generation method may include: sensing an illuminance of light by the photometric sensor; determining whether the illuminance of the light exceeds a predetermined threshold value; controlling the ultraviolet lamp to generate the photochromic effect in the light transmitting cover based on the illuminance of the light relative to the threshold value; and generating the image signal by the image capturing device based on the light transmitted through the light transmitting cover.

The controlling the ultraviolet lamp may include: turning on the ultraviolet lamp to generate the photochromic effect in the light transmitting cover based on the illuminance of the light being greater than the threshold value, and turning off the ultraviolet lamp to reduce the photochromic effect in the light transmitting cover based on the illuminance of the light being less than the threshold value.

BRIEF DESCRIPTION OF DRAWINGS

The above and other aspects and features of the present disclosure will become more apparent by describing in detail exemplary embodiments thereof with reference to the attached drawings, in which:

FIG. 2 is a diagram illustrating a wide range of spectral components of sunlight irradiated outdoors;

FIG. 10A is a diagram illustrating a case where the camera device is installed in an indoor environment, and FIG. 10B is a diagram illustrating a case where the camera device is installed in an outdoor environment.

DETAILED DESCRIPTION

Figure 1:
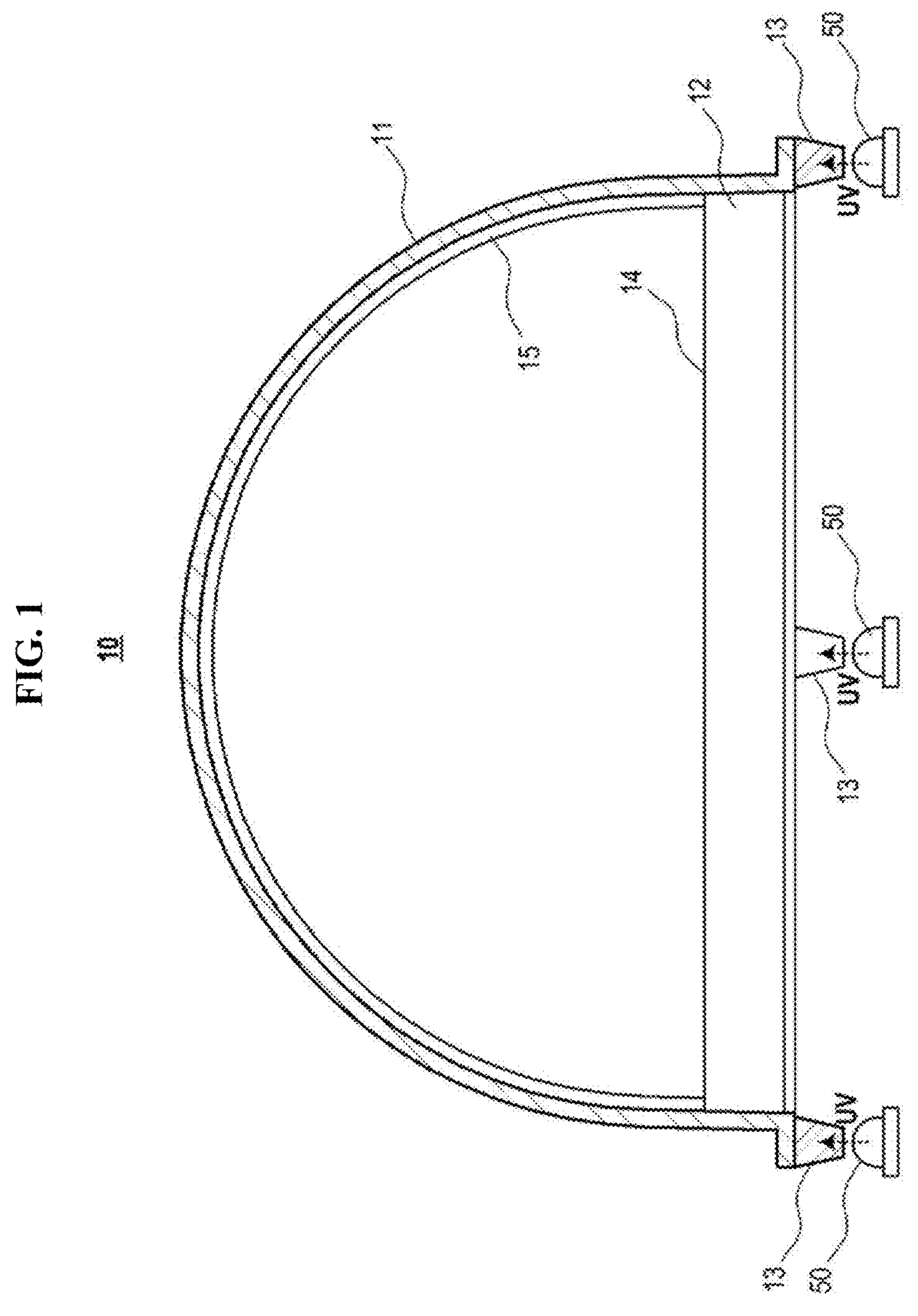
FIG. 1 is a cross-sectional view illustrating an arrangement of a light transmitting cover and an ultraviolet lamp according to an exemplary embodiment of the present disclosure.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. Advantages and features of the disclosure and methods to achieve them will become apparent from the descriptions of exemplary embodiments herein below with reference to the accompanying drawings.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. It will be understood that the terms "includes," "comprises," "has," "having," "including," and/or "comprising," when used in this specification, specify the presence of stated features, figures, steps, operations, components, members, or combinations thereof, but do not preclude the presence or addition of one or more other features, figures, steps, operations, components, members, or combinations thereof. The term "or" includes any and all combinations of one or more of a plurality of associated listed items.

As used herein, each of the expressions "A or B," "at least one of A and B," "at least one of A or B," "A, B, or C," "at least one of A, B, and C," and "at least one of A, B, or C," may include one or all possible combinations of the items listed together with a corresponding expression among the expressions.

It will be understood that the terms "first", "second", or the like, may be used to distinguish one aspect of the disclosure from another, and should not be construed as limiting in other respects (e.g., importance or order).

As used herein, "image" may refer to a single image, a sequence of images, or a series of images displayed in rapid succession such as video or the like.

Hereinafter, exemplary embodiments of the present disclosure will be described in detail with reference to the accompanying drawings.

FIG. 1 is a cross-sectional view illustrating an arrangement of a light transmitting cover 10 and an ultraviolet lamp 50 according to an exemplary embodiment of the present disclosure.

In general, a size/diameter of the light transmitting cover 10 is determined according to specifications related to tilting/panning required by a camera device and an angle of view of a lens of an image capturing module. The light transmitting cover 10 may include a transparent layer 11 exhibiting a photochromic effect and a diffusion layer 12 diffusing ultraviolet rays incident from one or more ultraviolet lamps 50. The one or more ultraviolet lamps 50 may be disposed at equal intervals along a circumferential direction of an end of a dome-shaped light transmitting cover 10. For example, four ultraviolet lamps 50 may be disposed at intervals of 90° along the circumferential direction.

The ultraviolet lamps 50 irradiate ultraviolet rays toward an incident portion 13 formed at an end of the diffusion layer 12. The incident portion 13 may be formed of a light pipe having a tapered shape in order to efficiently transfer the ultraviolet rays. The ultraviolet rays irradiated in the form of a point light source are incident on the incident unit 13 and then diffused in the form of surface light emission within the diffusion layer 12. To this end, the diffusion layer 12 may be formed physically by a micro-scratch or formed by a chemical method of mixing a diffusion agent. Here, the diffusion layer 12 may be manufactured integrally with the transparent layer 11 by insert injection or double injection or manufactured by a bonding method by fusion with the transparent layer 11.

The ultraviolet ray irradiated by the ultraviolet lamp 50 may be diffused through the diffusion layer 12 and then propagated to an entire area of the transparent layer 11 while being totally reflected within the transparent layer 11. Here, in order to exhibit a photochromic function or a photochromic effect, the transparent layer 11 may contain a photochromic material as a pigment and be integrally formed or a coating layer 15 containing the photochromic material may be coated on an inner surface of the transparent layer 11.

The photochromic material has a property of reducing light transmissivity, that is, a property of making the transparent layer containing the photochromic material dark, when irradiated with an ultraviolet ray. As the photochromic material, spiropyrans, spirooxazines, fulgides, diarylethenes, silver halides, organic dyes, and the like, may be used.

Figure 2:
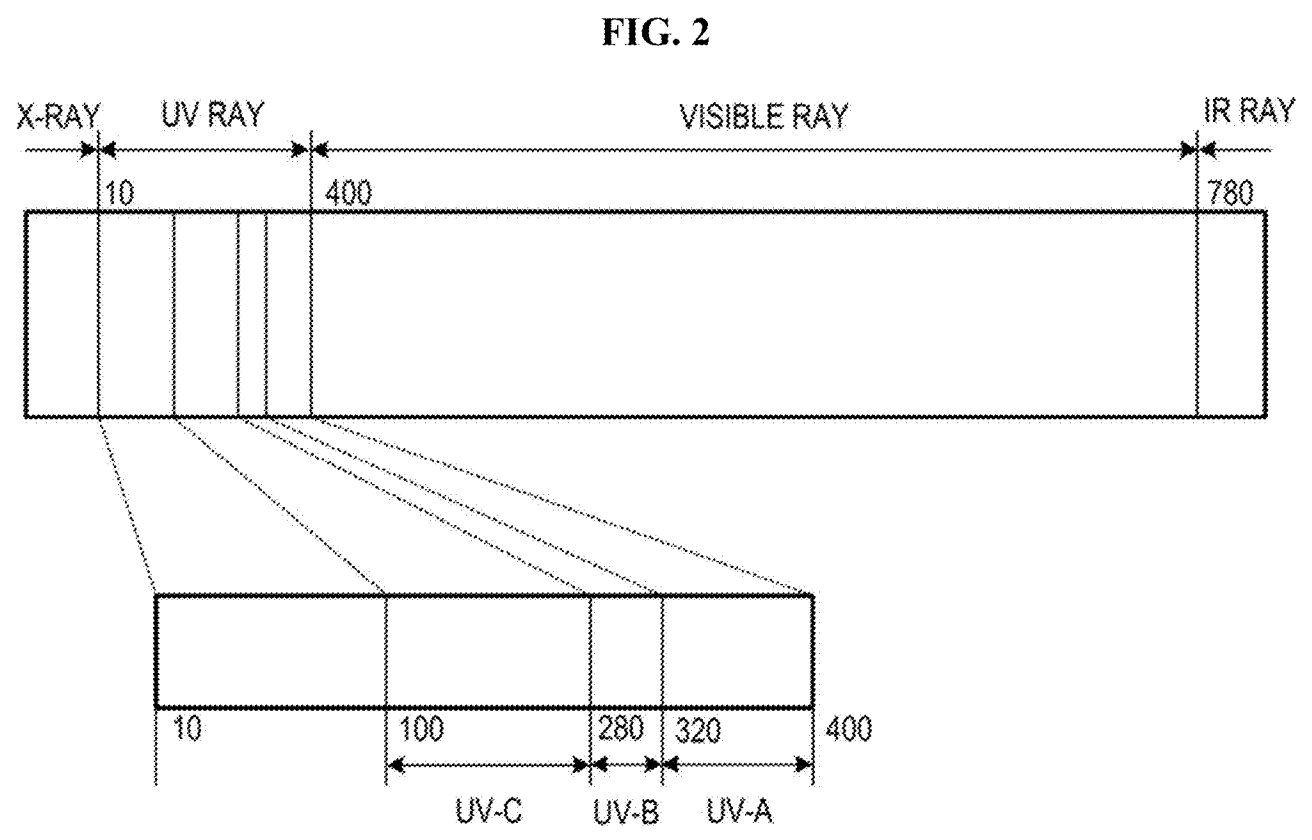

As illustrated in FIG. 2, sunlight irradiated outdoors has a wide range of spectral components such as an X-ray, an ultraviolet ray, a visible ray, and an infrared ray. Among them, the ultraviolet ray represents a spectrum positioned between the short wavelength side of the visible ray and the X-ray. Such an ultraviolet ray may be further divided into sub-bands such as UV-A, UV-B, and UV-C. When the photochromic material is exposed to an ultraviolet ray having a wavelength of approximately 100 to 400 nm, anions emit electrons and combine with metal ions to change the photochromic material into metal atoms, and when the ultraviolet ray disappears, the photochromic material that has been changed into the metal atoms returns to its original transparent state while returning to the form of metal cations. However, such an ultraviolet ray is naturally provided in an outdoor environment under sunlight, whereas there is no ultraviolet component in an indoor environment illuminated with separate visible light lighting. Therefore, in controlling a camera device having a photochromic function, it is necessary to consider whether an environment in which the camera device is installed is the indoor environment or the outdoor environment.

Figure 3:
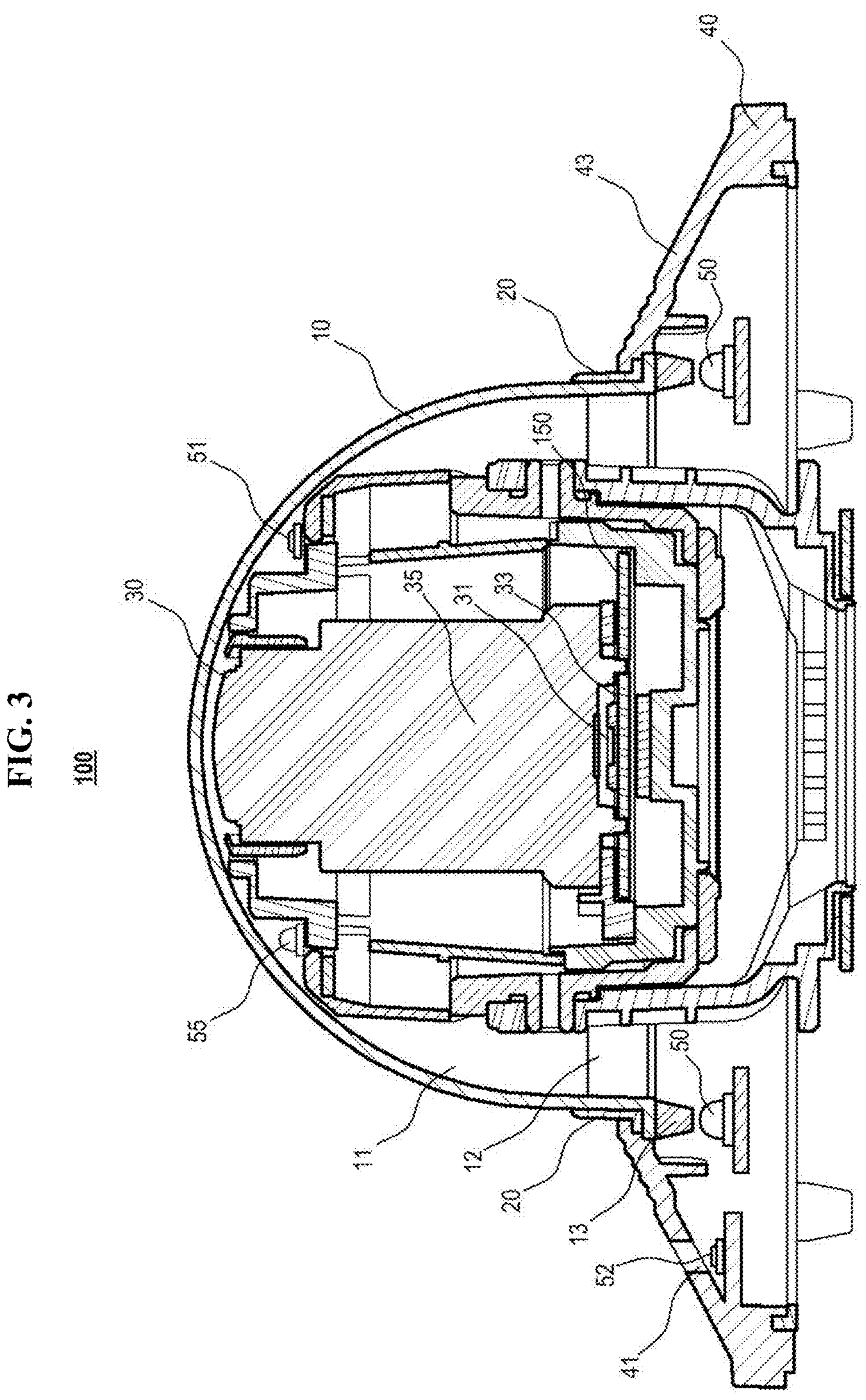
FIG. 3 is a cross-sectional view of a camera device in an assembled state according to an exemplary embodiment of the present disclosure.

FIG. 3 is a cross-sectional view of a camera device 100 in an assembled state according to an exemplary embodiment of the present disclosure.

Figure 7:
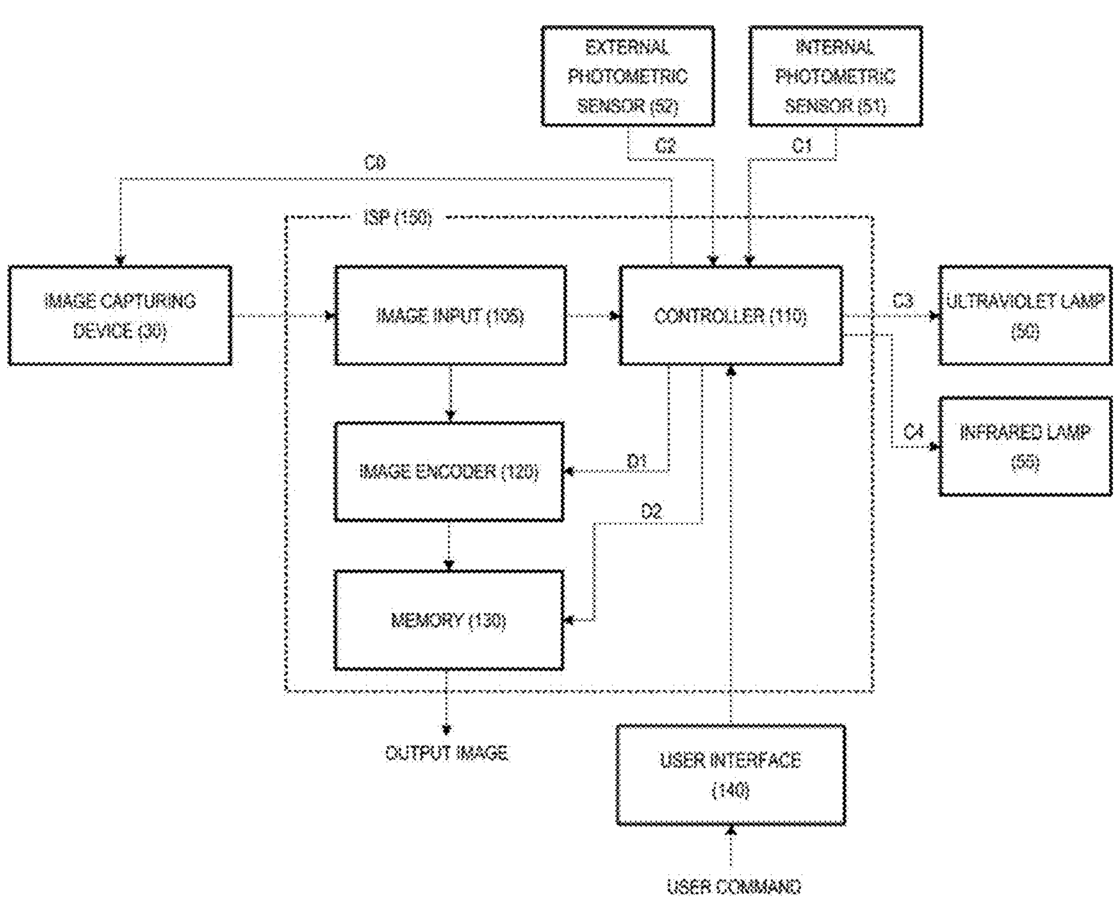
FIG. 7 is a block diagram illustrating a configuration and a function of an image signal processor disposed inside the camera device of FIG. 3.

The camera device 100 may be configured to include an image capturing device 30 capturing an image of a subject to generate an image signal, a housing 40 housing the image capturing device 30, a light transmitting cover 10 coupled to the housing 40 and transmitting light from the subject therethrough, photometric sensors 51 and 52 measuring illuminance of the light, an ultraviolet lamp 50 disposed on one side of the light transmitting cover 10 so as to irradiate an ultraviolet ray (UV), and a controller 110 (see FIG. 7)

performing turn-on/off control of the ultraviolet lamp 50 according to illuminance measurement results of the photometric sensors 51 and 52. The image capturing device 30 may be generally configured to include an image sensor 31 implemented as a charge coupled device (CCD), a complementary metal oxide semiconductor (CMOS), or the like, so as to obtain an electrical signal (image signal) from the subject, a substrate 33 on which the image sensor 31 is disposed, and an optics 35 through which the light passing through the light transmitting cover 10 passes. An image signal processor (ISP) 150 may be installed in the housing 40 separately from or integrally with the image capturing device 30. A more detailed configuration of the ISP 150 will be described later with reference to FIG. 7.

As described above, the light transmitting cover 10 exhibits the photochromic effect by the ultraviolet ray generated by the ultraviolet lamp 50. The photometric sensors 51 and 52 may be configured as a single member, but is not limited thereto. For instance, the photometric sensors 51 and 52 may be configured as an internal photometric sensor 51 and an external photometric sensor 52. The internal photometric sensor 51 is disposed inside the light transmitting cover 10 and senses illuminance of light that is transmitted through the light transmitting cover 10, and the external photometric sensor 52 is disposed outside the light transmitting cover 10 and directly senses illuminance of external light that is not transmitted through the light transmitting cover 10. Accordingly, the external photometric sensor 52 may be installed on one side (top cover side) of the housing 40 and disposed toward a window 41 formed in the housing 40.

The ultraviolet ray irradiated by the ultraviolet lamp 50 may be observed as a blue color from the outside depending on its wavelength. Accordingly, a light blocking cover 20 for preventing an operation of the ultraviolet lamp 50 from being viewed from the outside and preventing damage to a human body or the surrounding environment due to leakage of ultraviolet light leaked to the outside may be implemented. The light blocking cover 20 may be installed at a position where an end of the light transmitting cover 10 is coupled to the housing 40, and has a partition wall blocking the ultraviolet ray generated from the ultraviolet lamp 50 from being emitted to the outside. Such a light blocking cover 20 may be manufactured integrally with the light blocking cover 10 through insert injection or double injection, and when the light blocking cover 20 is installed, an upper end of the light blocking cover 20 may be higher than a boundary line 14 (see FIG. 1) between the transparent layer 11 and the diffusion layer 12 of the light transmitting cover 10.

In addition, the light blocking cover 20 may further include a second partition wall blocking the ultraviolet ray generated from the ultraviolet lamp 50 from being emitted toward the image capturing device 30 inside the housing 40. The second partition wall may serve to prevent damage to internal components of the camera device 100 due to permeation of the ultraviolet ray and prevent deterioration in quality of the image captured by the image capturing device 30.

Figure 4:
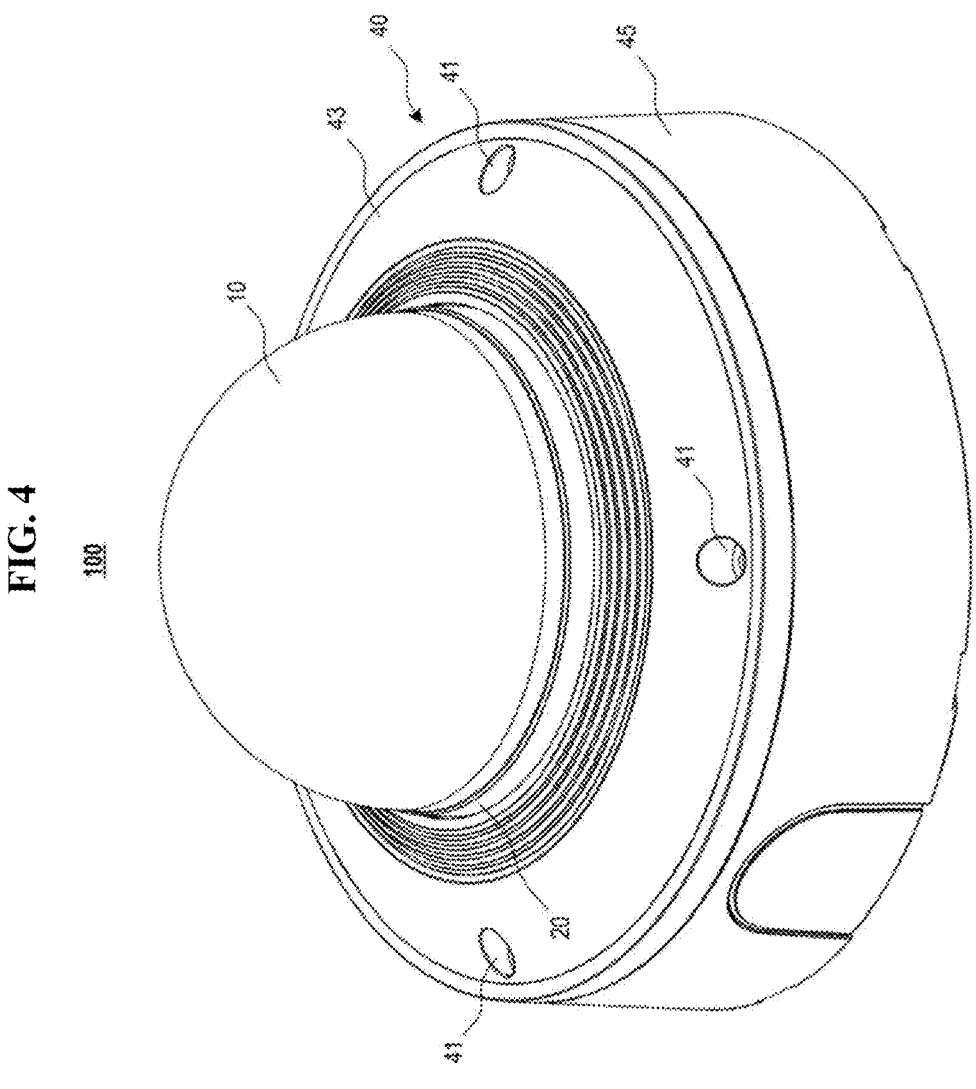
FIG. 4 is an assembled perspective view of the camera device according to an exemplary embodiment of the present disclosure.

FIG. 4 is an assembled perspective view of the camera device 100 according to an exemplary embodiment of the present disclosure.

The light transmitting cover 10 is disposed at an upper end of the camera device 100, and is coupled to a central opening of the housing 40. Here, the housing 40 may include, for example, a combination of a top cover 43 and a lower case 45 assembled to each other. A window or a through hole 41 may be formed at a position corresponding to the external photometric sensor 52, in the top cover 43. In addition, the light blocking member 20 having a predetermined height may be interposed between the top cover 43 of the housing 40 and the light transmitting cover 10.

Figure 5A:
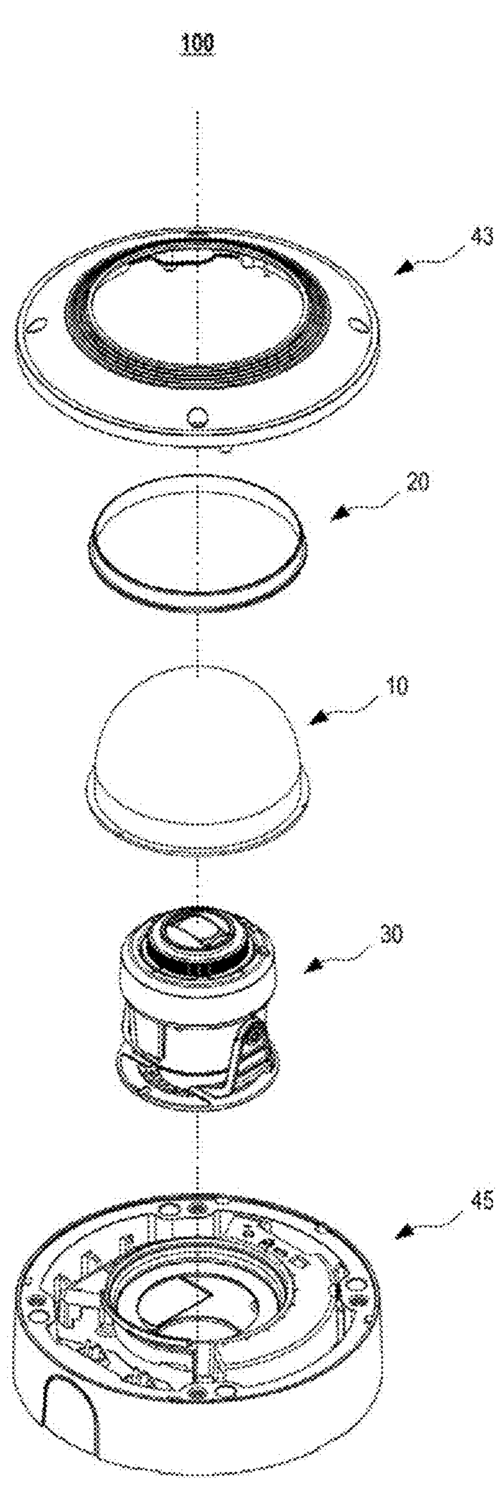
FIG. 5A is an exploded perspective view of the camera device according to an exemplary embodiment of the present disclosure.
Figure 5B:
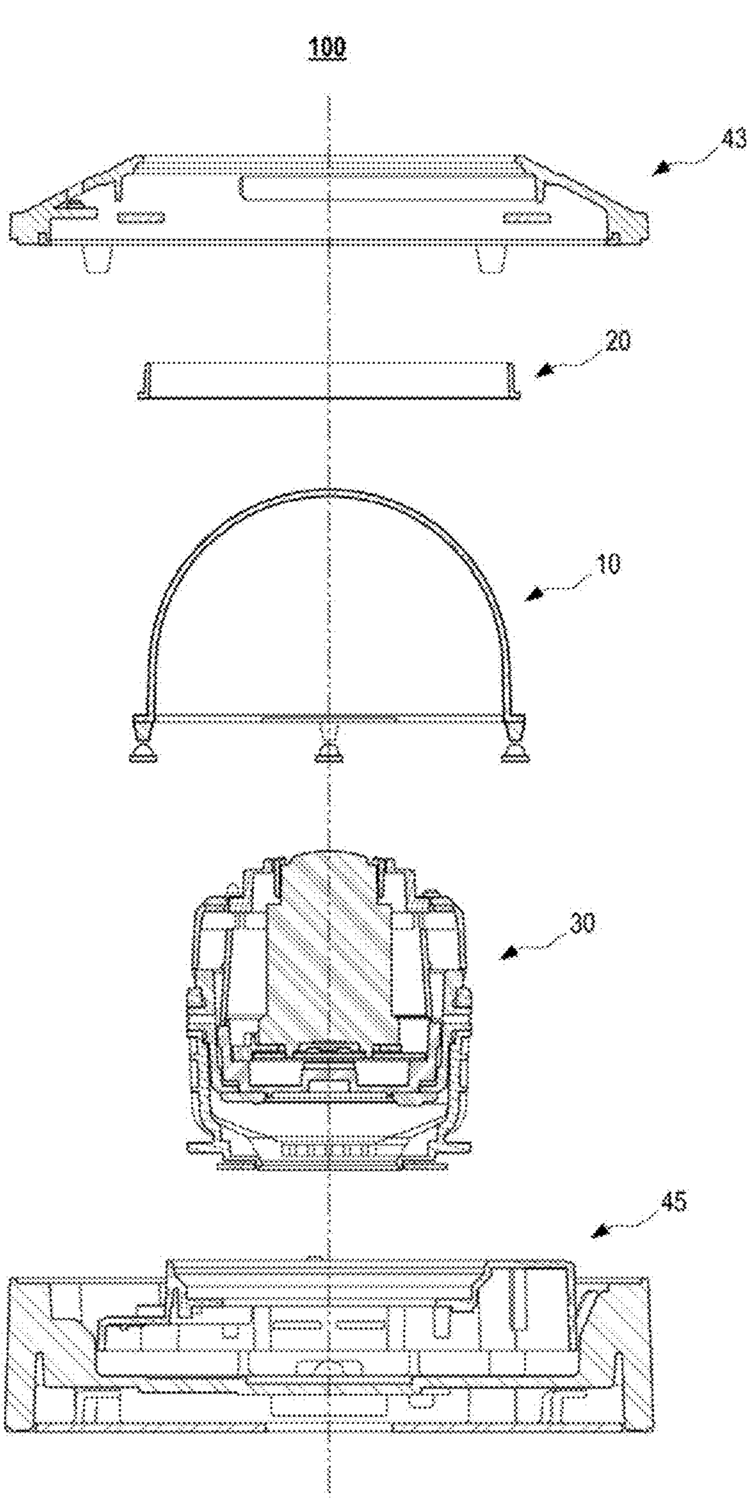
FIG. 5B is an exploded cross-sectional view of the camera device.

FIG. 5A is an exploded perspective view of the camera device 100 of FIG. 3, and FIG. 5B is an exploded cross-sectional view of the camera device 100 of FIG. 3.

In order to assemble the camera device 100, the top cover 43 of the housing 40 may be assembled to the light transmitting cover 10 from top to bottom in a state in which the light blocking member 20 is fitted onto an outer peripheral surface of the light transmitting cover 10. Thereafter, the image capturing device 30 and the ultraviolet lamp 50 may be mounted on the lower case 45, and the top cover 43 may be coupled to the lower case 45 and fastened to the lower case 45 by fixing means such as screws or pins to complete the assembly of the camera device 100.

When an intensity of the ultraviolet ray irradiated from the ultraviolet lamp 50 exceeds a threshold value, a photochromic effect occurs in the transparent layer 11 of the light transmitting cover 10, such that the inside of the camera device 100 is not observed from the outside.

Figure 6:
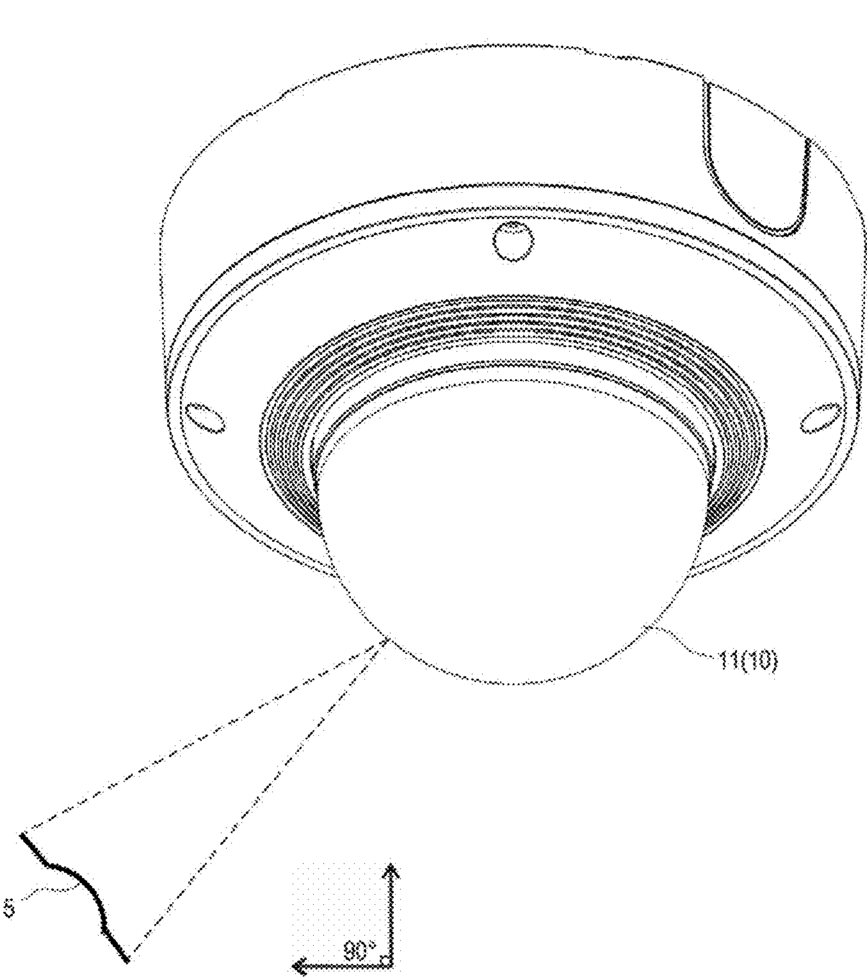
FIG. 6 is a view illustrating an example of a dimple formed on an outer surface of the light transmitting cover.

FIG. 6 is a view illustrating an example of a dimple 5 formed on an outer surface of the light transmitting cover 10.

A plurality of dimples 5 may be formed on the outer surface of the light transmitting cover 10 by micro-etching in order to prevent water droplets from being formed on the outer surface of the light transmitting cover 10. Such dimples 5 may be inclined and have a concave round shape to have high surface uniformity and have improved water-repellent performance than square pillar-shaped grooves or cylindrical grooves. The high surface uniformity (e.g., no angled or no bent angle) may also act as an advantageous factor for the photochromic effect.

FIG. 7 is a block diagram illustrating a configuration and a function of an image signal processor (ISP) 150 disposed inside the camera device 200 of FIG. 3.

The ISP 50 may basically include a controller 110 and a memory 130, and may further include an image input 105 inputting the image obtained by the image capturing device 30 in a predetermined image format and an image encoder 120 compressing an image (raw format image) provided by the image input 105 or generated by the controller 110 by a standard codec such as H.264, H.265, moving picture experts group (MPEG), and motion joint photographic experts group (M-JPEG).

The controller 110 may control an overall operation of the ISP 50 based on a user command through a user interface 140. The controller 110 may be physically implemented by analog and/or digital circuits including one or more of a logic gate, an integrated circuit, a microprocessor, a microcontroller, a memory circuit, a passive electronic component, an active electronic component, an optical component, and the like, and may implement or execute software and/or firmware to perform the functions or operations described herein. For example, the controller 110 may be a type of processor, and may be implemented as a physical element such as a central processing unit (CPU) or a microcomputer (MICOM). In addition, the memory 130 is a storage medium storing a result performed by the controller 110, data necessary for an operation of the controller 110, or an image generated within the ISP 150, and may be implemented as a volatile memory or a non-volatile memory.

The controller 110 may control the ultraviolet lamp 50 to be turned on when illuminance C2 measured by the external photometric sensor 52 exceeds a threshold value. Through this, the photochromic effect may occur in the light transmitting cover 10, such that the inside of the camera device 100 is not observed from the outside.

In addition, the controller 110 may decide whether or not illuminance C1 measured by the internal photometric sensor 51 is within a specific range and may adjust an intensity of the ultraviolet lamp 50 so that the illuminance C1 is within the specific range when the illuminance C1 is not within the specific range. The specific range refers to a range within which the illuminance C1 falls in order for the light transmitting cover 10 having the given photochromic effect to properly exhibit a light blocking effect. Accordingly, when the illuminance C1 is out of the specific range, the light transmitting cover 10 may not exhibit a desired light blocking effect (desired photochromic level), and thus, the controller 110 variably performs feedback control C3 on the intensity of the ultraviolet lamp 50 based on the illuminance C1. The feedback control C3 includes proportional control based on a current (or an output) supplied to the ultraviolet lamp 50 and a time, in addition to variable control based on the intensity of the ultraviolet lamp 50. A lighting environment may continuously change even in a state in which an appropriate photochromic effect has already occurred, and a photochromic degree may change over time even though there is no change in the lighting environment, and thus, such feedback control C3 by the controller 110 may be required.

In addition, the controller 110 may control the ultraviolet lamp 50 to be turned off when the illuminance measured by the external photometric sensor 52 is less than the threshold value. That is, when the illuminance is lowered and the outside of the camera device 100 becomes sufficiently dark, it may be difficult to observe the inside of the camera device 100 from the outside through the light transmitting cover 10 (i.e., there is no security problem), and thus, it may be necessary to improve a quality of the image obtained by the image capturing device 30 by turning off the ultraviolet lamp 50.

As illustrated in FIG. 3, the housing 40 of the camera device 100 may be further provided with an infrared lamp 55 emitting infrared light. When the illuminance C2 measured by the external photometric sensor 52 is less than the threshold value, the controller 110 may control the ultraviolet lamp 50 to be turned off (C3) and at the same time control the infrared lamp 55 to be turned on (C4).

In this case, the image capturing device 30 may generate a color image when the infrared lamp 55 is in a turn-off state and generate a black-and-white image when the infrared lamp 55 is in a turn-on state. Maintaining continuity of surveillance involves obtaining a black-and-white infrared or near-infrared image because it may be difficult to obtain a high-quality visible light image in a dark environment. In such a dark environment, not only is there no security problem, but an amount of light may be insufficient, and thus, the ultraviolet lamp 50 may be turned off so that photochromism does not occur.

Figure 8:
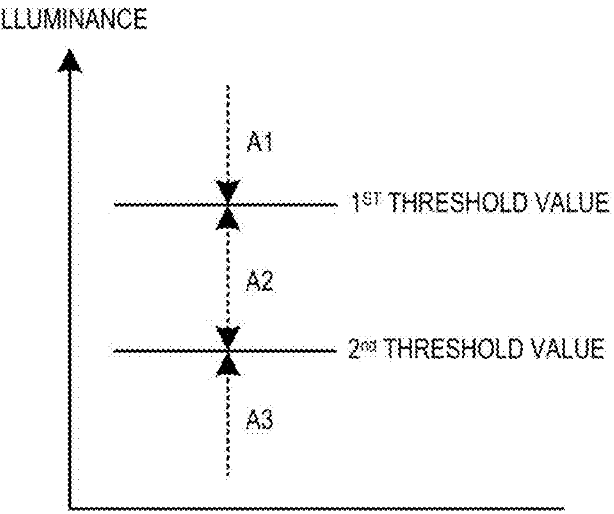
FIG. 8 is a diagram illustrating a concept of controlling turn-on/off of the ultraviolet lamp according to a relationship between illuminance and threshold values.

However, according to an embodiment, the controller 110 may use separate threshold values for each of the ultraviolet lamp 50 and the infrared lamp 55 rather than to simultaneously control the turn-on/off of the ultraviolet lamp 50 and the turn-on/off of the infrared lamp 55 based on a single threshold value as described above. For example, as illustrated in FIG. 8, a threshold value (first threshold value) of the illuminance C2 of the external photometric sensor 52, which is a standard for turning off the ultraviolet lamp 50, may be higher than a threshold value (second threshold value) of the illuminance C2 of the external photometric sensor 52, which is a standard for turning on the infrared lamp 55. The reason is that illuminance in a dark environment in which the infrared lamp 55 should be turned on because it may be difficult to obtain a visible light image, may be lower than illuminance in a moderately dark environment in which a security problem may not occur.

Accordingly, the controller 110 may control the ultraviolet lamp 50 to be turned off when the illuminance C2 measured by the external photometric sensor 52 is less than the first threshold value, and control the infrared lamp 55 to be turned on when the illuminance C2 is less than the second threshold value lower than the first threshold value. Referring to FIG. 8, when the illuminance C2 is higher than the first threshold value (A1), the ultraviolet lamp 50 may be controlled to be turned on and the infrared lamp 55 may be controlled to be turned off. In addition, when the illuminance C2 is lower than the first threshold value and higher than the second threshold value A2, both the ultraviolet lamp 50 and the infrared lamp 55 may be controlled to be turned off. Further, when the illuminance C2 is lower than the second threshold value, the ultraviolet lamp 50 may be controlled to be turned off and the infrared lamp 55 may be controlled to be turned on.

Referring to FIG. 7 again, the controller 110 may generate a wideband image D1 by synthesizing image frames provided from the image input 105 and provide the wideband image D1 to the image encoder 120 in order to compress the wideband image D1. The controller 110 may generate the wideband image D1 by synthesizing a first image frame (relatively dark image frame due to the photochromic effect) captured in a state in which the ultraviolet lamp 50 is turned on and a second image frame (relatively bright image frame without the photochromic effect) captured in a state in which the ultraviolet lamp 50 is turned off.

When a light-saturated pixel area exists in the second image frame captured in a state in which there is no photochromic effect, a light-saturated pixel area may be removed in the first image frame captured in a state in which there is a photochromic effect. In this case, the first image frame may correspond to a short exposure image, and the second image frame may correspond to a long exposure image.

Figure 9:
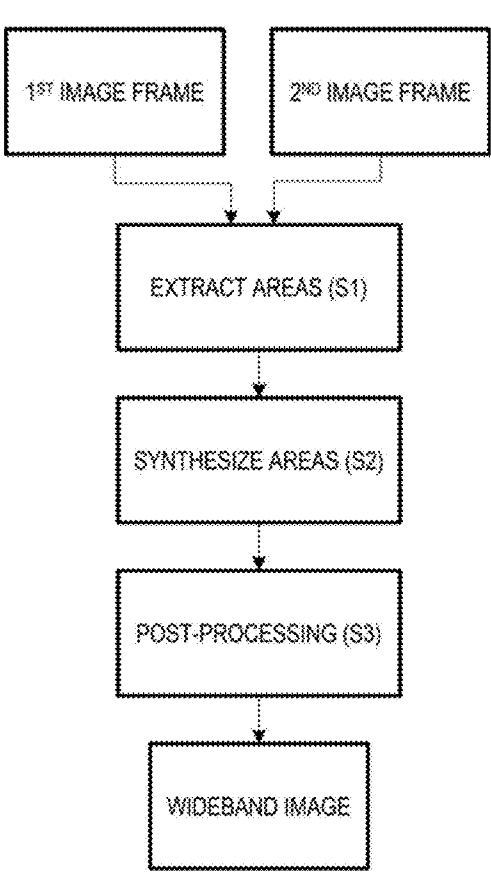
FIG. 9 is a diagram illustrating a process of synthesizing a wideband image frame from a plurality of image frames.

Referring to FIG. 9, the controller 110 may extract an area corresponding to the light-saturated pixel area in the second image frame from the first image frame, and extract an area other than the light-saturated pixel area in the second image frame from the second image frame (S1). Then, the controller 110 may generate a wideband image by synthesizing the areas extracted from the respective image frames (S2). In this case, an unnatural area may occur through the synthesis, and thus, the controller 110 may additionally apply post-processing (e.g., gamma adjustment, white balancing, noise filtering, sharpness adjustment, contrast adjustment, etc.) to the generated wideband image (S3).

Alternatively, the controller 110 may generate a wideband image by synthesizing a first image obtained by transmitting light from the subject through the light transmitting cover 10 in which the photochromic effect occurs according to an ultraviolet ray of a first intensity and a second image obtained by transmitting the light from the subject through the light transmitting cover 10 in which the photochromic effect is eliminated or reduced according to an ultraviolet ray of a second intensity lower than the first intensity.

The camera device 100 according to the present disclosure may be installed in an indoor environment as illustrated in FIG. 10A or installed in an outdoor environment as illustrated in FIG. 10B. However, an ultraviolet ray is naturally provided in the outdoor environment under sunlight, whereas there may be no ultraviolet component in the indoor environment illuminated with separate visible light lighting. Therefore, control of a camera device having a photochromic function may vary depending on whether an environment in which the camera device is installed is the indoor environment or the outdoor environment.

When the camera device 100 is installed in the outdoor environment, an ultraviolet sensor measuring an ultraviolet ray intensity of external light may be included. Such an ultraviolet sensor may be installed separately in the camera device 100 or be configured integrally with the external photometric sensor 52. For example, when the external photometric sensor 52 may sense an ultraviolet region in addition to the visible ray as illustrated in FIG. 2 and measure an intensity of the ultraviolet ray, a separate ultraviolet sensor may not be required.

When the illuminance (e.g., visible light illuminance or the like) measured by the external photometric sensor 52 exceeds the threshold value and an intensity of an ultraviolet ray measured by the ultraviolet sensor is less than a reference value, the controller 110 may control the ultraviolet lamp 50 to be turned on.

In such an external environment, a final ultraviolet ray intensity may be determined by adding up an ultraviolet ray intensity measured from an ultraviolet ray included in the external light and an intensity of an ultraviolet ray provided by turning on the ultraviolet lamp 50. Accordingly, the controller 110 may variably control an intensity of the ultraviolet lamp 50 under the external light including the ultraviolet ray to produce a desired photochromic effect. Here, the intensity of the ultraviolet lamp 50 may decrease as the intensity of the ultraviolet ray included in the external light increases (e.g., may be inversely proportional control).

In addition, a user may store an intensity D2 of the ultraviolet lamp 50 that may exhibit the photochromic effect in the memory 130 as a user option by the user interface 140. Later, when the user option stored by the user interface 140 is called, the controller 110 may control the ultraviolet lamp 50 to irradiate the ultraviolet ray at an intensity corresponding to the user option by reading the memory 130.

In the camera device 100 installed in the outdoor environment, the user may select an option for additional photochromism (security preference) or select an opposite option (image quality preference) when the weather is cloudy or during the day such as a sunset time zone depending on his/her wish, and thus, a function of storing and calling such a user option may allow the user to actively reflect his/her preference for a photochromic degree.

The controller 110 may perform control for changing a shutter speed or a diaphragm aperture of the image capturing device 30 so as to prevent a light saturation phenomenon from occurring in an output image under the intensity of the ultraviolet ray measured by the ultraviolet sensor, that is, in a state in which the light transmitting cover 10 of the camera device 100 put in the external environment is subjected to photochromism to some extent. In a state in which there is no photochromism at all, the shutter speed or a size of the diaphragm aperture should be set to a small value in order to prevent the light saturation phenomenon from occurring, but in a state in which the light transmitting cover 10 is subjected to the photochromism, even though the shutter speed or the size of the diaphragm aperture is set to an appropriate value, the light saturation phenomenon may be prevented, and thus, a shutter or a diaphragm may not require high specifications.

Figure 11:
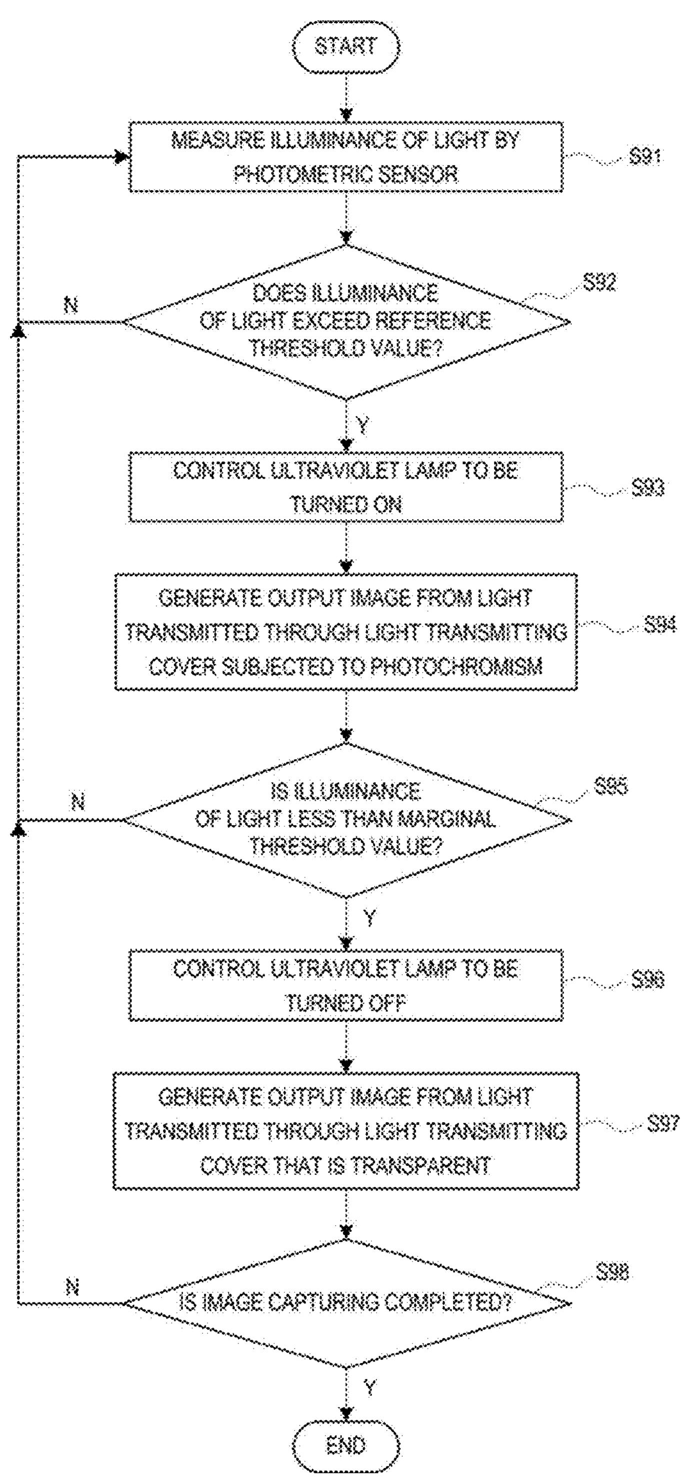
FIG. 11 is a flowchart illustrating an image generation method according to an exemplary embodiment of the present disclosure.

FIG. 11 is a flowchart illustrating an image generation method according to an exemplary embodiment of the present disclosure.

The image generation method may be performed in the camera device 100 including the image capturing device 30 capturing the image of the subject to generate the image signal, the light transmitting cover 10 transmitting the light from the subject therethrough and exhibiting the photochromic effect depending on the intensity of the ultraviolet ray, the photometric sensors 51 and 52 measuring the illuminance of the light, and the ultraviolet lamp 50 configured to irradiate the ultraviolet ray (UV) to an inner surface of the light transmitting cover 10.

First, the photometric sensor 52 may measure the illuminance C2 of the external light (S91), and the controller 110 may determine whether or not the illuminance C2 of the external light exceeds a predetermined reference threshold value (S92).

When the illuminance C2 of the external light exceeds the reference threshold value (Y in S92), the controller 110 may control the ultraviolet lamp 50 to be turned on in order to generate the photochromic effect in the light transmitting cover 10 (S93), and generate an output image (image signal) from the light transmitted through the light transmitting cover 10 subjected to photochromism (S94).

When the illuminance C2 of the external light is less than a marginal threshold value (Y in S95), the controller 110 may control the ultraviolet lamp 50 to be turned off in order to reduce or eliminate the photochromic effect in the light transmitting cover 10 (S96), and generate an output image (image signal) from the light transmitted through the light transmitting cover 10 that is not subjected to the photochromism or is transparent (S97). Thereafter, when image capturing is completed (Y in S98), a process ends, and otherwise (N in S98), a process returns to S91. In addition, even when the illuminance C2 of the external light does not exceed the reference threshold value (N in S92) or is not less than the marginal threshold value (N in S95), a process returns to S91.

Here, the marginal threshold value may be introduced to provide a margin in order to prevent the ultraviolet lamp 50 from being frequently turned on/off when the illuminance C2 frequently changes near the reference threshold value. When the margin is 0, the reference threshold value and the marginal threshold value may be the same as each other, and when the margin is not 0, the marginal threshold value may be lower than the reference threshold value by a set margin. Such a concept may be similarly applied when the ultraviolet lamp 50 is switched from a turn-off state to a turn-on state. In this case, the marginal threshold value may be higher than the reference threshold value by a set margin.

The image generating method may further include controlling the infrared lamp 55 to be turned on by the controller 110 when the measured illuminance is less than the second threshold value lower than the threshold value.

In addition, the image generation method may further include generating a color image signal by the image capturing device 30 when the infrared lamp 55 is in the turn-off state and generating a black-and-white image signal by the image capturing device 30 when the infrared lamp 55 is in the turn-on state.

In addition, the image generation method may further include generating a wideband image by synthesizing a first image obtained by the image capturing device 30 in a state in which the photochromic effect appears in the light transmitting cover 10 and a second image obtained by the image capturing device 30 in a state in which the photochromic effect is reduced or eliminated in the light transmitting cover 10.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A camera device comprising:

an image capturing device configured to capture an image to generate an image signal;

a housing in which the image capturing device is provided;

a light transmitting cover coupled to the housing and configured to transmit light therethrough;

a photometric sensor configured to sense an illuminance of light;

an ultraviolet lamp provided on one side of the light transmitting cover and configured to irradiate an ultraviolet ray; and a controller configured to control the ultraviolet lamp according to an illuminance sensed by the photometric sensor, wherein the light transmitting cover is configured to exhibit a photochromic effect based on the ultraviolet ray irradiated by the ultraviolet lamp, and wherein the photometric sensor comprises:

an internal photometric sensor provided inside the light transmitting cover and configured to sense an illuminance of light that is transmitted through the light transmitting cover; and an external photometric sensor provided outside the light transmitting cover and configured to sense an illuminance of external light.

2. The camera device of claim 1, wherein the external photometric sensor is provided on the housing corresponding to at least one through hole formed in the housing.

3. The camera device of claim 1, wherein, based on the illuminance sensed by the external photometric sensor exceeding a threshold value, the controller is further configured to turn on the ultraviolet lamp to generate the photochromic effect in the light transmitting cover.

4. The camera device of claim 1, wherein the controller is further configured to adjust an intensity of the ultraviolet lamp based on the illuminance sensed by the internal photometric sensor relative to a predetermined range.

5. The camera device of claim 1, wherein the light transmitting cover comprises:

a transparent layer configured to exhibit the photochromic effect; and a diffusion layer configured to diffuse the ultraviolet ray from the ultraviolet lamp via surface light emission, and wherein the ultraviolet lamp is configured to irradiate the ultraviolet ray toward an incident portion provided at an end of the diffusion layer.

6. The camera device of claim 5, further comprising a light blocking cover provided at a coupling between an end of the light transmitting cover and the housing, and comprising a first partition wall configured to block the ultraviolet ray generated from the ultraviolet lamp from being emitted to the outside.

7. The camera device of claim 3, wherein, based on the illuminance sensed by the external photometric sensor being less than the threshold value, the controller is further configured to turn off the ultraviolet lamp.

8. The camera device of claim 3, further comprising an infrared lamp configured to emit infrared light, wherein, based on the illuminance sensed by the external photometric sensor being less than the threshold value, the controller is further configured to turn off the ultraviolet lamp and turn on the infrared lamp.

9. The camera device of claim 8, wherein the image capturing device is configured to:

generate a color image based on the infrared lamp being in an off state, and generate a black-and-white image based on the infrared lamp being in an on state.

10. The camera device of claim 3, further comprising an infrared lamp configured to emit infrared light, wherein, based on the illuminance sensed by the external photometric sensor being less than a second threshold value lower than the threshold value, the controller is further configured to turn on the infrared lamp.

11. The camera device of claim 3, further comprising an ultraviolet sensor configured to sense an ultraviolet ray intensity of the external light, wherein, based on the illuminance sensed by the external photometric sensor being greater than the threshold value and the ultraviolet ray intensity of the external light sensed by the ultraviolet sensor being less than a reference value, the controller is configured to turn on the ultraviolet lamp.

12. The camera device of claim 11, wherein the controller is further configured to control an intensity of the ultraviolet lamp such that a combined intensity of the sensed ultraviolet ray intensity of the external light and an intensity of the ultraviolet ray irradiated by the ultraviolet lamp are within an ultraviolet ray intensity range that generates the photochromic effect.

13. A camera device comprising:

an image capturing device configured to capture an image to generate an image signal;

a housing in which the image capturing device is provided;

a light transmitting cover coupled to the housing, configured to transmit light therethrough, and comprising a photochromic material that exhibits a photochromic effect based on an ultraviolet ray irradiated from outside; and a controller configured to perform image signal processing on the generated image signal to generate an output image, wherein, based on an intensity of the ultraviolet ray being greater than a threshold value, the photochromic effect is generated in the light transmitting cover, and wherein the controller is further configured to generate the output image according to a first image based on light transmitted through the light transmitting cover in which the photochromic effect is generated according to an ultraviolet ray of a first intensity and a second image based on light transmitted through the light transmitting cover in which the photochromic effect is generated according to an ultraviolet ray of a second intensity lower than the first intensity.

14. The camera device of claim 13, wherein the controller is further configured to generate the output image according to the first image based on light transmitted through the light transmitting cover in which the photochromic effect is generated according to an ultraviolet ray of a specific intensity and the second image based on light transmitted through the light transmitting cover in which the photochromic effect is not generated.

15. The camera device of claim 13, further comprising a photometric sensor configured to sense the intensity of the ultraviolet ray irradiated from the outside, wherein the controller is further configured to control at least one of a shutter speed and a diaphragm aperture of the image capturing device within a range in which a light saturation phenomenon does not occur in the output image generated based on the intensity of the ultraviolet ray.

16. The camera device of claim 13, wherein the photochromic material comprises one or more of spiropyrans, spirooxazines, fulgides, diarylethenes, silver halides, and organic dyes.

17. A camera device comprising:

an image capturing device configured to capture an image to generate an image signal;

a housing in which the image capturing device is provided;

a light transmitting cover coupled to the housing and configured to transmit light therethrough;

an external photometric sensor provided outside the light transmitting cover and configured to sense an illuminance of external light;

an ultraviolet lamp provided on one side of the light transmitting cover and configured to irradiate an ultraviolet ray;

a controller configured to control the ultraviolet lamp according to an illuminance sensed by the external photometric sensor; and an internal photometric sensor provided inside the light transmitting cover and configured to sense an illuminance of light that is transmitted through the light transmitting cover, wherein the light transmitting cover is configured to exhibit a photochromic effect based on the ultraviolet ray irradiated by the ultraviolet lamp, and wherein, based on the illuminance sensed by the external photometric sensor exceeding a threshold value, the controller is further configured to turn on the ultraviolet lamp to generate the photochromic effect in the light transmitting cover.

18. The camera device of claim 17, wherein the external photometric sensor is provided on the housing corresponding to at least one through hole formed in the housing.

19. The camera device of claim 17, wherein the controller is further configured to adjust an intensity of the ultraviolet lamp based on the illuminance sensed by the internal photometric sensor relative to a predetermined range.

* * * * *